(12) United States Patent
Terwart et al.

(10) Patent No.: US 10,190,679 B2
(45) Date of Patent: Jan. 29, 2019

(54) FLOW OUTPUT DETERMINATION METHOD FOR A HYDRAULIC PUMP IN A TRANSMISSION HYDRAULIC SYSTEM

(71) Applicant: ZF Friedrichshafen AG, Friedrichshafen (DE)

(72) Inventors: Markus Terwart, Thundorf (DE); Rainer Novak, Bregenz (AT)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 84 days.

(21) Appl. No.: 15/435,754

(22) Filed: Feb. 17, 2017

(65) Prior Publication Data
US 2017/0234422 A1  Aug. 17, 2017

(30) Foreign Application Priority Data
Feb. 17, 2016  (DE) .................. 10 2016 202 414

(51) Int. Cl.
| | | |
|---|---|---|
| *F16H 61/00* | (2006.01) | |
| *F16H 61/06* | (2006.01) | |
| *F16H 61/12* | (2010.01) | |

(52) U.S. Cl.
CPC ....... *F16H 61/061* (2013.01); *F16H 61/0021* (2013.01); *F16H 61/12* (2013.01); *F16H 2061/0053* (2013.01); *F16H 2061/064* (2013.01)

(58) Field of Classification Search
CPC .... F16H 61/061; F16H 61/0021; F16H 61/12; F16H 2061/0053; F16H 2061/064
See application file for complete search history.

(56) References Cited

U.S. PATENT DOCUMENTS

| | | | |
|---|---|---|---|
| 6,110,072 A | 8/2000 | Harada et al. | |
| 2016/0121254 A1* | 5/2016 | Bohrer | B01D 46/444 96/401 |
| 2016/0363215 A1* | 12/2016 | Kohler | B60K 6/387 |

(Continued)

FOREIGN PATENT DOCUMENTS

| | | |
|---|---|---|
| DE | 19929770 A1 | 1/2000 |
| DE | 102009050462 A1 | 4/2011 |
| DE | 102013109047 B3 | 12/2014 |

OTHER PUBLICATIONS

German Search Report DE102016202414.0, dated Nov. 9, 2016. (7 pages).

*Primary Examiner* — David J Hlavka
(74) *Attorney, Agent, or Firm* — Dority & Manning, P.A.

(57) ABSTRACT

A method for determining a conveying capacity of a hydraulic pump includes opening a blockable flow cross-section in order to connect a pressure side of the hydraulic pump to an area of the hydraulic system through the flow cross-section after operating the hydraulic pump driven at a defined rotational speed. The flow cross-section is configured with the hydraulic pump such that an entire conveying volume flow provided by the hydraulic pump is guided through the flow cross-section when the flow cross-section is open. The method further includes comparing a change to an operating state of the transmission resulting from opening of the flow cross-section to a reference change to the operating state and determining the conveying capacity of the hydraulic pump as a function of a deviation between the change to the operating state and the reference change to the operating state.

12 Claims, 2 Drawing Sheets

(56) References Cited

U.S. PATENT DOCUMENTS

2017/0167603 A1\* 6/2017 Igarashi .................... F15B 1/04
2017/0226921 A1\* 8/2017 Aggstaller ............... F01P 11/16
2018/0135743 A1\* 5/2018 Guo .................... F16H 61/0021

\* cited by examiner

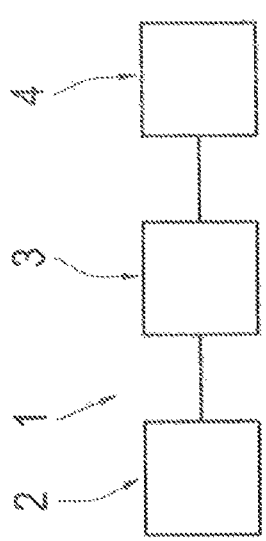
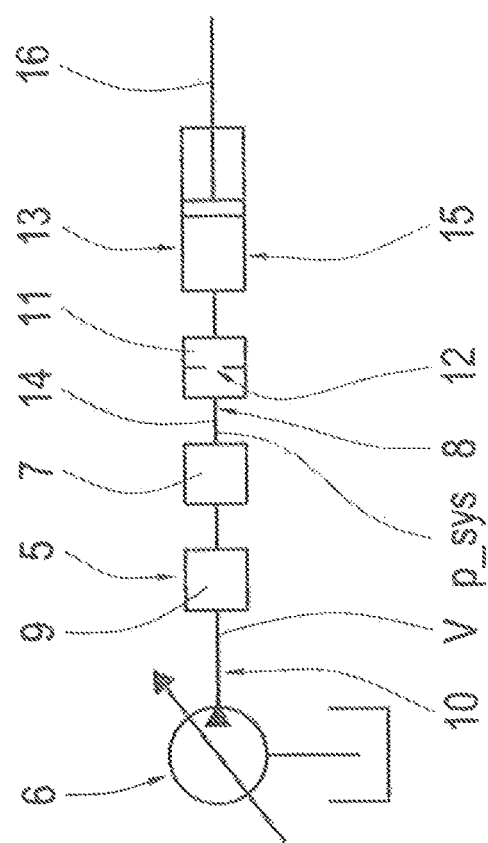

FLOW OUTPUT DETERMINATION METHOD FOR A HYDRAULIC PUMP IN A TRANSMISSION HYDRAULIC SYSTEM

FIELD OF THE INVENTION

The invention relates generally to a method for determining the conveying capacity of a hydraulic pump of a hydraulic system of a transmission.

BACKGROUND

With automatic transmissions known from practice, such as dual-clutch transmissions, so-called constant pumps, such as sickle-vane pumps, single or double-stroke vane cell pumps or the like, are provided for hydraulic supply, as is generally known. Such constant pumps are coupled with a fixed transmission ratio with a transmission input shaft, and are driven with the rotational speed of a drive unit of a vehicle drive train coupled to the transmission input shaft or to a rotational speed corresponding to this. As a result, as the rotational speed of the drive unit increases, the conveying capacity of the pump also directly increases. Starting from a comparatively low drive rotational speed of the hydraulic pump or the constant pump, the latter conveys a correspondingly high conveying volume flow, in order to supply the automatic transmission with hydraulic fluid in a sufficient scope and present a desired high performance, for example, during a shifting process of a vehicle.

Since the conveying capacity of constant pumps is to be designed in such a manner that an automatic transmission is supplied with sufficient hydraulic fluid by its hydraulic pump over its entire operating range, and, at low drive rotational speeds, a hydraulic pump conveys a volume of hydraulic fluid required for this, such a design of the hydraulic pump leads to the fact that, with increasing drive rotational speed, a constant pump conveys greater volumes of hydraulic fluid than is required for the supply of an automatic transmission. Such large volumes of hydraulic fluid conveyed by the hydraulic pump over wide operating ranges of an automatic transmission increases the power losses of automatic transmissions to an undesired extent, which in turn results in an increase in the energy consumption of a drive unit of a vehicle drive train, which can be at least one internal combustion engine, at least one electric motor or a combination of at least one internal combustion engine and at least one electric motor.

In order to be able to implement defined energy consumption targets of drive units to the extent required, adjustable hydraulic pumps, which are increasingly designed as controllable variable displacement pumps, are employed. Such pumps are designed with a correspondingly intelligent, software-driven activation function and a displacement volume that can be varied between a minimum value and a maximum value. If adjustable hydraulic pumps convey their defined maximum value, they are operating in their so-called "full stroke operation" and feature the conveying behavior of a constant pump.

A method for operating a hydraulic actuating device for a transmission with two hydraulic pumps, where at least the conveying capacity of one of the hydraulic pumps is variable, is known from DE 10 2014 207 798 A1. The described hydraulic pumps are controlled by an electromagnetic pressure regulator and, disadvantageously, feature in their overall assembly temperature-dependent production tolerances that are inherent in their principles and cause an increased actuating effort.

Through an adaptation described in the applicant's non-published patent application DE 10 2014 226 548.7 during a regulating operation of a variable displacement pump, during which the variable displacement pump or hydraulic pump may provide a higher conveying volume than is currently required, it can be ensured that the pump-side conveying volume flow, after saturation of an operating point-dependent leakage of a hydraulic control device of the automatic transmission and the indirect compensation of the inaccuracy caused by the control system also corresponds to the conveying volume flow, which is to be adjusted according to a request.

In this case, a so-called "self-leakage," which is present in the area of the variable displacement pump, is itself compensated by a hydraulic circuit of the variable displacement pump. In full stroke operation, the variable displacement pump is operated with a corresponding self-leakage for which there is no compensation. Such an operating state of a variable displacement pump arises mainly if the hydraulic pump is driven by a drive unit that is designed as an internal combustion engine, the rotational speed of which currently features a so-called "idle speed level."

If, in the area of the hydraulic system of a transmission, based on a request, such a high volume flow of hydraulic fluid is guided in the direction of a hydraulic load, which is higher than the volume flow of hydraulic fluid currently provided by the hydraulic pump, this represents a violation of the volume flow balance based on an actuation of the actuator system that is too rapid, which results in an over-excitation of the system. Such an over-excitation of the system in turn causes a collapse of the so-called "system pressure" of the hydraulic system in the direction of a pressure level, at which the behavior of clutch valves assigned to shifting elements, such as clutches, changes to the effect that it varies suddenly by a significant value. Such changes to the operating state in the area of the clutch valves produce, for the driver, reaction moments that are unexpected and impair driving comfort in the area of the vehicle drive train, which cause discontinuities in the progression of an output torque and jolts and shocks result from these discontinuities.

However, the limitation of the actuation gradient of the hydraulic system of a transmission is limited from physical aspects, since, for example, actuation sequences during a gear change are to be performed within defined operating times.

Therefore, during progressions of operating states, during which high leakage volume flows arise, the idle speed of the engine is increased by a correspondingly high value, in order to ensure that the adjustable hydraulic pump, during a full stroke operation or a constant pump, provides a flow of conveying volume that is required to prevent an under-supply state.

However, since, as is generally known, hydraulic pumps have certain production tolerances and, over their service lives, experience increased leakage volume flows in the area of a hydraulic pump because of wear, the so-called "increased idle speed" is selected to be correspondingly high, in order to, even during unfavorable progressions of operating states, convey the volume of hydraulic fluid required for avoiding under-supply operating states of a hydraulic system by an adjustable hydraulic pump.

However, this approach once again impairs the degree of efficiency of a vehicle, since higher rotational speeds bring about a higher energy consumption of drive units.

In contrast, hydraulic pumps of transmissions that have lower production tolerances and are operated to the same extent as hydraulic pumps of transmissions with higher production tolerances convey volumes of hydraulic fluid that are unnecessarily high, which in turn also impairs the overall degree of efficiency of a transmission. Therefore, there are attempts to keep the conveying volume of the hydraulic pump as low as possible. This requirement adversely affects driving comfort during unfavorable progressions of operating states. This is the case, for example, if the leakage volume flows resulting from the production tolerances and from increasing wear exceed the value underlying the design of the conveying volume in the area of a transmission designed with a hydraulic pump.

SUMMARY OF THE INVENTION

Example aspects of the present invention provide a method for determining the conveying capacity of a hydraulic pump of a hydraulic system of a transmission by which, on the one hand, under-supply operating states of a hydraulic system can be avoided with little effort, and, in addition, a transmission can be operated with a high degree of efficiency.

With the method in accordance with example aspects of the invention for determining the conveying capacity of a hydraulic pump of a hydraulic system of a transmission, the hydraulic pump is driven at defined rotational speed during the determination of the conveying capacity. Subsequently, a pressure side of the hydraulic pump is connected to an area of the hydraulic system through a blockable flow cross-section. Thereby, the flow cross-section is thus adapted to the hydraulic pump in such a manner that, with an open flow cross-section, the entire conveying volume flow currently provided by the hydraulic pump can be guided in the direction of the area of the hydraulic system through the flow cross-section. A change to the operating state of the transmission resulting from the opening of the flow cross-section is compared with a reference change to the operating state of a reference transmission, whereas the conveying capacity of the hydraulic pump is determined as a function of a deviation between the current change to the operating state and the reference change to the operating state.

Thereby, the approach in accordance with example aspects of the invention is subject to both a qualitative determination as to whether the conveying capacity is greater or smaller than the conveying capacity of the hydraulic pump of the reference transmission, and a quantitative determination of the conveying capacity of the currently considered hydraulic pump and an evaluation of the conveying capacity of the hydraulic pump, as a function of the calculated deviation.

By the approach in accordance with example aspects of the invention, in a simple manner, the conveying capacity of a hydraulic pump of a hydraulic system of a transmission, which is operated as a constant pump or is designed as a hydraulic pump that is operated in full stroke operation and is adjustable, can be determined, and the hydraulic pump can be actuated in a corresponding manner as a function of the deviation, in order to, on the one hand, avoid under-supply operating states of a transmission and, on the other hand, reduce power losses in the area of the hydraulic pump due to a conveying capacity that is currently too high. Thus, a transmission can be operated with a desired high degree of efficiency, and the energy consumption of a vehicle designed with the hydraulic pump and the transmission can be reduced. Such advantages are achievable both in the case of highly tolerance-affected designs of a hydraulic pump and a hydraulic system of a transmission and in the case of premature wear. In addition, even transmissions with limited functionality can be operated in a scope required for a high degree of driving comfort.

If the conveying capacity of the hydraulic pump is determined during a parking operating state of the transmission, during which an output shaft of the transmission is held in a torque-proof manner, undefined operating states of the transmission that impair driving operation, which may arise during the conducting of the method, are not adjusted during driving operation.

If the rotational speed with which the hydraulic pump is driven by an input shaft of the transmission corresponds to an idle speed of a drive unit of a vehicle drive train connected to the transmission input shaft or a corresponding rotational speed, the method in accordance with example aspects of the invention can be carried out in a simple manner. This results from the fact that the flow cross-section required for the determination of the conveying capacity can be provided, in a structurally simple and space-saving manner, in the area of an existing component of the hydraulic system or of a transmission control device. This is not easily the case at higher conveying capacities of the hydraulic pump, since, if applicable, a correspondingly higher volume flow of hydraulic fluid should then be discharged through the flow cross-section, and the flow cross-section must be of an undesirably large design.

If the pressure upstream of the flow cross-section is adjusted prior to opening the flow cross-section to a value that is higher than a maximum drop of the pressure present upstream of the flow cross-section resulting from the opening of the flow cross-section, and if the conveying capacity is calculated as a function of a deviation between the drop in pressure and a reference value of the drop in the pressure of the reference transmission, it is ensured that the overall drop in the pressure resulting from the opening of the flow cross-section can be determined. In addition, it is ensured that the entire volume flow available from the hydraulic pump can be guided in the direction of the area of the transmission through the flow cross-section acting as an aperture.

With variants of the method in accordance with example aspects of the invention that are easy to carry out, with a positive deviation between the drop in the pressure and the reference value, a conveying capacity of the hydraulic pump of the transmission that is increased compared to the conveying capacity of the hydraulic pump of the reference transmission is determined, and/or, with a negative deviation between the drop in the pressure and the reference value, a conveying capacity of the hydraulic pump that is lower compared to the conveying capacity of the hydraulic pump of the reference transmission is calculated.

If an actuator of the transmission is subjected to and actuated by hydraulic fluid through the opening of the flow cross-section, and if a change to the operating state of the actuator resulting from the actuation is monitored and a time period until the actuator has reached a defined operating state is determined, the conveying capacity of the hydraulic pump of the transmission can be determined or can be evaluated to the desired extent, with little actuating effort, as a function of a deviation between the calculated time period and a reference value of the time period of the reference transmission.

Thereby, with little effort, the option exists of, with a negative deviation between the time period and the reference value, determining a conveying capacity of the hydraulic pump of the transmission that is increased compared to the conveying capacity of the hydraulic pump of the reference transmission, and/or, with a positive deviation between the time period and the reference value, calculating a conveying capacity of the hydraulic pump of the transmission that is reduced in comparison to the conveying capacity of the hydraulic pump of the reference transmission.

With a variant of the method in accordance with example aspects of the invention that can be carried out with little effort in terms of structure and in a cost-effective manner, the pressure upstream of the flow cross-section is determined through measurement technology by a measuring device arranged in the area of an actuator that is subjected to pressure, whereas the pressure level of the actuating pressure to be applied in the area of the actuator is adjusted to a value that is greater than the pressure that is present upstream of the flow cross-section with a closed flow cross-section.

Thereby, in turn, upon the calculation of a conveying capacity of the hydraulic pump of the transmission, which is greater than the conveying capacity of the hydraulic pump of the reference transmission, the idle speed of the drive unit is reduced by one decrement in order to minimize power losses.

In contrast to this, upon the calculation of the conveying capacity of the hydraulic pump of the transmission, which is smaller than the conveying capacity of the hydraulic pump of the reference transmission, the idle speed of the drive unit is raised by one increment in order to avoid under-supply operating states.

Both the characteristics specified in the claims and the characteristics specified in the subsequent embodiments of the object in accordance with the invention are, by themselves alone or in any combination with one another, suitable for providing additional forms for the object in accordance with the invention.

Additional advantages and advantageous embodiments of the hydraulic actuating device in accordance with the invention arise from the patent claims and the embodiments described below, with reference to the drawing in terms of principle, whereas, in the description of the various embodiments, for the benefit of clarity, the same reference signs are used for structurally and functionally identical components.

BRIEF DESCRIPTION OF THE DRAWINGS

The following is shown:

FIG. 1 is a schematic representation of a vehicle drive train with a drive unit, an output and a transmission arranged between the drive unit and the output in the power flow of the vehicle drive train;

FIG. 2 is a partial schematic representation of a hydraulic circuit of a hydraulic system of the transmission in accordance with FIG. 1;

DETAILED DESCRIPTION

Figure 4:
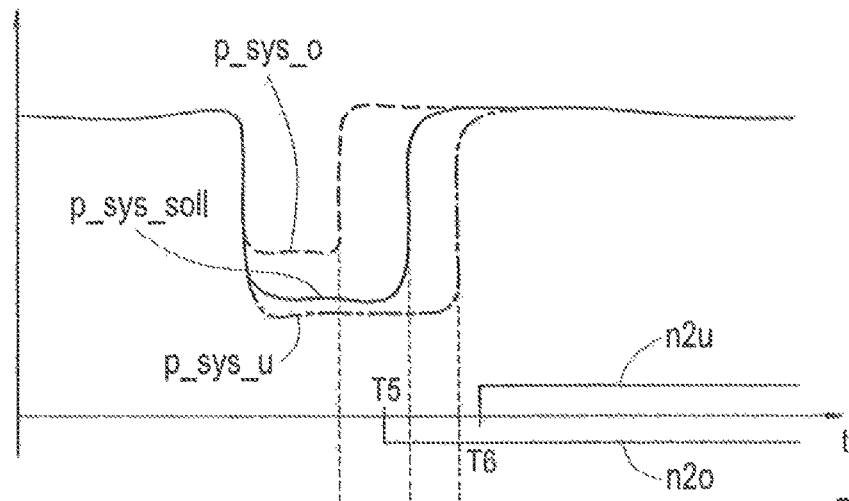
FIG. 4 is a plot of various progressions of a system pressure present in a primary pressure circuit of the hydraulic system in accordance with FIG. 2, which are adjusted during various conveying capacities of the hydraulic pump of the transmission in accordance with FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic representation of a vehicle drive train 1 with a drive unit 2, with a transmission 3 designed as a dual-clutch transmission and with an output 4. The transmission 3 is in operative connection on the input side with the drive unit 2 and on the output side with the output 4. The transmission 3 is designed with a hydraulic system 5, shown partially in FIG. 2, which includes an adjustable hydraulic pump 6. In example embodiments of the present invention, the adjustable hydraulic pump 6 is a controllable vane cell pump, through which a variable conveying volume can be made available. The conveying volume of the hydraulic pump 6 can be adjusted through a valve device (not shown). Alternatively, there is also the option of designing the hydraulic pump as a constant pump.

In addition to the valve device, the hydraulic system 5 also includes a "system pressure valve" 7, in the area of which a system pressure p_sys can be adjusted in a pressure circuit 8 of the hydraulic system 5 that is designed as a primary pressure circuit. The pressure circuit 8 is, through the system pressure valve 7, supplied with hydraulic fluid provided by the hydraulic pump 6 with higher priority than a secondary pressure circuit that is also arranged downstream of the system pressure valve 7. Various components of the transmission 3, which are not shown in more detail in FIG. 2, are supplied with hydraulic fluid both through the primary pressure circuit 8 and through the secondary pressure circuit. Shifting elements (among other things) of a dual-clutch system of the transmission 3 are subjected to actuating pressure through the primary pressure circuit 8, while a cooling and lubricating oil system of the transmission 3 is supplied with hydraulic fluid through the secondary pressure circuit.

In accordance with example aspects of the present invention, a conveying volume flow V of the hydraulic pump 6 can be applied to the system pressure valve 7 through an additional valve device 9. In order to prevent, in particular, an under-supply of the secondary pressure circuit and the cooling and lubrication system supplied with hydraulic fluid through the secondary pressure circuit, the hydraulic pump 6 provides a correspondingly high conveying volume V. With this conveying volume V, both the primary pressure circuit 8 and the secondary pressure circuit are supplied with hydraulic fluid independently of downstream leakage volume flows and a volume flow of hydraulic fluid flowing in the area of electrohydraulic pressure regulators. If the conveying volume provided in each case by the hydraulic pump 6 is adjusted too high, this impairs the degree of efficiency of the transmission 2.

In order to be able to operate the transmission 2 and thus a vehicle designed with the vehicle drive train 1 with a degree of efficiency that is as high as possible, the approach described in more detail below is carried out. By operating the transmission 2 in such a manner, the respective conveying volume provided by the hydraulic pump 6 and thus the conveying capacity of the hydraulic pump 6 can be determined at least qualitatively. Furthermore, through the approach described above, undesired under-supply operating states of the hydraulic system 5 and thus of the transmission 3 can also be avoided in a simple manner.

During a vehicle standstill and upon a simultaneous request on the part of the driver to display a parking operating state of the vehicle drive train 1 or of the transmission 3, at which the output 4 and thus the transmission output of the transmission 3 are held in a known manner, the drive unit 2 is typically operated at a rotational speed that is also referred to as the idle speed. In order to, in such an operating state, supply the transmission 3 and also the hydraulic system 5 through the hydraulic pump 6 with the required volumes of hydraulic fluid, the idle speed of the drive unit 2 is adjusted to a level required for this purpose. In accordance with example aspects of the present invention, the hydraulic pump 6 is driven directly by the drive unit 2 through an input shaft of the transmission 2 such that the drive rotational speed of the hydraulic pump 6 is essentially equal to the rotational speed of the drive unit 2. Depending on the particular application, a transmission may be provided with a defined transmission ratio between the transmission input shaft and the hydraulic pump 6, through which the rotational speed of the drive unit 2 in each case is transformed to a higher or a lower rotational speed level.

Independently of the connection of the hydraulic pump 6 to the drive unit 2, the idle speed of the drive unit 2 is guided to a level at which, through the conveying volume of the hydraulic pump 6, in addition to the supply of the hydraulic system 5 or of the transmission 3, leaks in the area of the hydraulic system 5 or the transmission 3 are fully compensated. The displacement volume of the hydraulic pump 6 is thereby adjusted to a defined maximum value, by which the adjustable hydraulic pump 6 is in full stroke operation and features a conveying behavior corresponding to a constant pump. This means that the conveying volume provided by the hydraulic pump 6 varies only as a function of the drive rotational speed of the hydraulic pump 6.

Subsequent to this, in accordance with example aspects of the present invention, a pressure side 10 of the hydraulic pump 6 is connected, downstream of the system pressure valve 7, through a blockable flow cross-section 12 provided in the area of an electrohydraulic pressure regulator 11 of the hydraulic system 5, to an area 13 of the hydraulic system 5. The flow cross-section 12 is matched to the conveying behavior of the hydraulic pump 6 in the full stroke range in such a manner that, with an open flow cross-section 12, the entire conveying volume flow currently provided by the hydraulic pump 6, which is driven with the idle speed of the drive unit 2 with a displacement volume that is simultaneously adjusted to a maximum, is guided through the flow cross-section 12 in the direction of the area 13 of the hydraulic system 5.

A change to the operating state of the transmission 3 resulting from the opening of the flow cross-section 12 is compared to a reference change to the operating state of a reference transmission in the manner described in more detail below. Subsequently, the conveying capacity of the hydraulic pump 6 is determined as a function of a deviation between the current change to the operating state and the reference change to the operating state.

With the embodiment of the hydraulic system 5 in accordance with FIG. 2 under consideration here, the electrohydraulic pressure regulator 11 or the actuator valve is completely moved into its end stop during the control described above for opening the flow cross-section 12. In this operating state of the electrohydraulic pressure regulator 11, the line 14 featuring the electrohydraulic pressure regulator 11, which runs from the system pressure supply or from the connection point of the hydraulic pump 6 in the direction of the area 13, then acts as an aperture. The system pressure p_sys is guided to a correspondingly high pressure level by a corresponding actuation of the system pressure valve 7 before the opening of the flow cross-section 12, in order to guide the entire conveying volume flow provided by the hydraulic pump 6 in the direction of the area 13 of the transmission 3 through the line 14 acting as an aperture.

The area 13 includes, among other things, an actuator 15, for example for clutch or transmission actuation, which is formed with geometrical dimensions that feature a desired high degree of robustness with respect to production tolerances.

In accordance with example aspects of the present invention, through the electrohydraulic pressure regulator 11, with an open flow cross-section 12, the actuator 15 designed as a piston-cylinder unit that is subjected to volumes of hydraulic fluid Thus, a shifting rail or rod 16 of the transmission 3 is actuated by the pressure application of the actuator 15. A shifting path sensor, by which an actuating path X16 of the shifting rod 16 can be detected, is assigned to the shifting rod 16.

Figure 3:
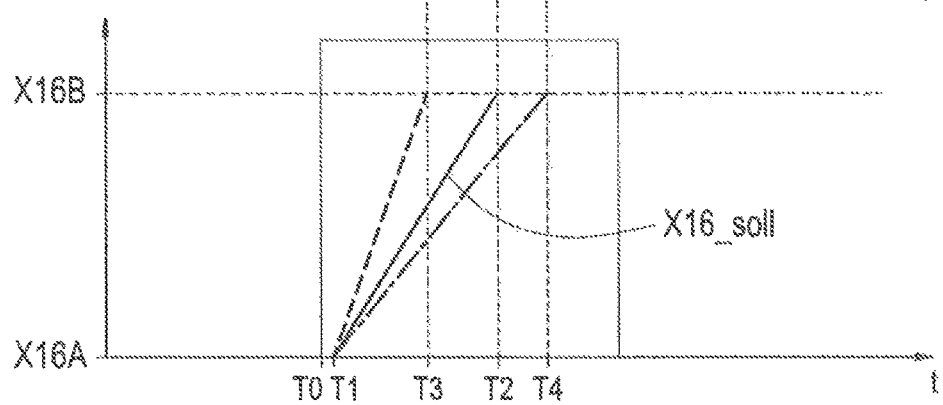
FIG. 3 is a plot of several displacement/time progressions of a shifting rod of the transmission in accordance with FIG. 1, which are adjusted upon various conveying capacities of a hydraulic pump of the transmission during a corresponding pressure application.

In FIG. 3, three progressions of the actuating path X16 of the shifting rod 16 are plotted over time t. A progression X16_soll displays the reference progression of the shifting rod actuation in FIG. 3. The progression X16_soll is adjusted if the hydraulic pump 6 of a reference transmission is driven, with defined production tolerances, with the idle speed of the drive unit 2.

In accordance with example aspects of the present invention, the electrohydraulic pressure regulator 11 is acted upon by a maximum actuating flow of the electrohydraulic pressure regulator 11 at a point in time T0 and the flow cross-section 12 is completely released. As a result, the actuator 15 is subjected to hydraulic fluid by the hydraulic pump 6. After the expiration of a deceleration period, the movement of the shifting rod 16 starting from the first end position X16A in the direction of its second end position X16B results from the subjecting of the actuator 15, and the shifting rod 16 executes a corresponding movement from a point in time T1. The shifting rod 16 of the reference transmission reaches its second end position X16B at a point in time T2 in accordance with the reference progression X16_soll.

If, through the shifting path sensor, the shifting rod 16 has already reached its second end position X16B at an additional point in time T3 preceding the point in time T2, the hydraulic pump 6 of the currently monitored transmission 3 conveys a higher conveying volume flow than is necessary or expected, by which under-supply operating states of the hydraulic system 5 and also the transmission 3 are reliably avoided. Conversely, however, the excessively high conveying volume of the hydraulic pump 6 leads to the fact that, in the area of the hydraulic pump 6, undesired power losses arise due to the excessively high conveying volume; in turn, this increases the fuel consumption of the drive unit 2.

In order to achieve a corresponding improvement in the degree of efficiency of the transmission 3, the current idle speed of the drive unit 2 is subsequently reduced by one decrement, and the conveying volume of the hydraulic pump 6 is thus lowered.

If, on the other hand, through the shifting path sensor, it is determined that the shifting rod 16, with an open flow cross-section 12, has reached its second end position X16B only at a point in time T4 following the point in time T2, a lower conveying capacity of the hydraulic pump 6 is calculated as the conveying capacity underlying the reference progression, and it is detected that, at the currently adjusted idle speed of the drive unit 2, the hydraulic pump 6 provides, if necessary, a conveying volume that is excessively low, and there is a risk of an under-supply of the hydraulic system 5 and the transmission 3.

In order to be able to avoid under-supply operating states of the hydraulic system 5 along with the transmission 3 in a simple manner, an iterative algorithm in turn is subsequently started, by which the idle speed of the drive unit 2 is correspondingly incremented for leakage compensation for future progressions of operating states.

In general, for the approach described above, the precise knowledge of the conveying volume flow conveyed by the hydraulic pump 6 is not required; rather, only the effect of the currently available conveying volume flow on the hydraulic system 5 and the transmission 3 is evaluated, by which the approach described above is characterized by a high degree of robustness with respect to the production tolerances of the entire actuating chain.

Since, through the actuation of the electrohydraulic pressure regulator 11 and the resulting opening of the flow cross-section 12, the system behavior features the same mode of action as an aperture, the control can be described with little effort through the following aperture equation:

$$Q = c \times \text{sqrt}(dP) = c\sqrt{dP}$$

Where, Q corresponds to the volume flow that is guided by the open flow cross-section 12, while c is an aperture constant of the flow cross-section 12, through which the structural conditions are taken into account. The second factor sqrt(dP) corresponds to the square root of the pressure difference between the pressure upstream of the flow cross-section 12 and the pressure downstream of the flow cross-section 12. For this reason, as an alternative to the previously described approach for FIG. 3, the collapse of the system pressure p_sys, which is adjusted by the opening of the flow cross-section 12, can be used to determine the conveying volume currently provided by the hydraulic pump 6.

As a function of the drop in the system pressure p_sys with an open flow cross-section 12, if the aperture constant c is simultaneously known, the option exists of directly determining the volume flow Q of the hydraulic pump 6, since the volume flow Q guided through the flow cross-section 12 corresponds to the conveying volume of the hydraulic pump 6.

With the approach last described, the option also exists of carrying out an iterative algorithm, which initially compares the currently determined conveying volume of the hydraulic pump 6 with a reference value, and subsequently corrects the current idle speed of the drive unit 2 with a correspondingly calculated deviation.

Accordingly, FIG. 4 plots three progressions of the system pressure p_sys over time t, whereas the progression p_sys_soll represents the target progression of the system pressure p_sys of a reference transmission, at which substantial power losses do not arise in the area of the hydraulic pump 6 based on an excessively high conveying volume, and under-supply operating states of the hydraulic system 5 and the transmission 3 do not arise based on an excessively low conveying volume of the hydraulic pump 6. In contrast to this, the progression p_sys_o corresponds to the progression of the system pressure p_sys, which is adjusted when the conveying volume of the hydraulic pump 6 is too high, which impairs the degree of efficiency of the transmission 3 to an undesired extent. The progression p_sys_u of the system pressure, which is also shown in FIG. 4, is adjusted with an open flow cross-section 12, if the conveying volume flow of the hydraulic pump 6, with the idle speed of the drive unit 2 that is currently present, is smaller than the conveying volume flow to be based on the progression p_sys_soll. If a drop in the system pressure p_sys corresponding to the progression p_sys_u is calculated, the conveying volume of the hydraulic pump 6 is too small to reliably avoid under-supply operating states of the hydraulic system 5 and the transmission 3 to the desired extent.

If an excessively high conveying volume flow of the hydraulic pump 6 is calculated, the idle speed is reduced correspondingly to the progression n2o from a point in time T5, while, in this case, the idle speed of the drive unit 2, with an excessively low conveying volume flow of the hydraulic pump 6, is raised correspondingly from a point in time T6 by one increment to the progression n2u of the rotational speed of the drive unit 2.

For the calculation with measuring technology of the system pressure p_sys, with example aspects of the present invention, through the corresponding control of clutch valves of the hydraulic system 5, a clutch pressure sensor is used, whereas, for this purpose, the actuating pressure of the clutch, which is assigned to the clutch pressure sensor, is adjusted to be higher than the expected system pressure p_sys to be measured.

Modifications and variations can be made to the embodiments illustrated or described herein without departing from the scope and spirit of the invention as set forth in the appended claims.

REFERENCE SIGNS

1 Vehicle drive train
2 Drive unit
3 Transmission
4 Output
5 Hydraulic system
6 Hydraulic pump
7 System pressure valve
8 Primary pressure circuit
9 Additional valve
10 Pressure side of the hydraulic pump
11 Electrohydraulic pressure regulator
12 Blockable flow cross-section
13 Area of the transmission
14 Line
15 Actuator
16 Shifting rod
n2u, n2o Progression of the idle speed of the drive unit
p_sys System pressure
p_sys_o, p_sys_u, p_sys_sol Progression of the system pressure
t Time
T0-T6 Discrete point in time
V Conveying volume flow
X16_soll Shifting path
X16A First end position of the shifting rod
X16B Second end position of the shifting rod

The invention claimed is:

1. A method for determining a conveying capacity of a hydraulic pump of a hydraulic system of a transmission, comprising:
operating the hydraulic pump at a defined rotational speed;
after operating the hydraulic pump driven at the defined rotational speed, opening a blockable flow cross-section in order to connect a pressure side of the hydraulic pump to an area of the hydraulic system through the flow cross-section, the flow cross-section configured with the hydraulic pump such that an entire conveying volume flow provided by the hydraulic pump is guided in a direction of the area of the hydraulic system through the flow cross-section when the flow cross-section is open;

comparing a change to an operating state of the transmission resulting from opening of the flow cross-section to a reference change to the operating state; and determining the conveying capacity of the hydraulic pump as a function of a deviation between the change to the operating state and the reference change to the operating state.

2. The method of claim 1, wherein the conveying capacity of the hydraulic pump is determined during a park operating state of the transmission, an output shaft of the transmission braked in the park operating state of the transmission.

3. The method of claim 1, wherein the hydraulic pump is driven by an input shaft of the transmission when the hydraulic pump is operated at the defined rotational speed, a rotational speed of the input shaft corresponding to an idle speed of a drive unit of a vehicle drive train connected to the input shaft or to a corresponding rotational speed.

4. The method of claim 1, further comprising, prior to opening the flow cross-section, adjusting a pressure upstream of the flow cross-section to a value that is greater than a maximum pressure drop upstream of the flow cross-section that results from opening of the flow cross-section, wherein the conveying capacity is determined by calculating the conveying capacity as a function of a deviation between a pressure drop of the pressure upstream of the flow cross-section resulting from opening of the flow cross-section and a reference pressure drop.

5. The method of claim 4, further comprising determining that the conveying capacity of the hydraulic pump is increased relative to a reference conveying capacity when the deviation between the pressure drop of the pressure upstream of the flow cross-section resulting from opening of the flow cross-section and the reference pressure drop is positive.

6. The method of claim 4, further comprising determining that the conveying capacity of the hydraulic pump is reduced relative to a reference conveying capacity when the deviation between the pressure drop of the pressure upstream of the flow cross-section resulting from opening of the flow cross-section and the reference pressure drop is negative.

7. The method of claim 4, wherein the pressure upstream of the flow cross-section is measured by a pressor sensor that is positioned proximate an actuator of the transmission, an actuating pressure applicable to the actuator adjustable to a value that is greater than the pressure upstream of the flow cross-section by closing the flow cross-section.

8. The method of claim 1, further comprising determining a time period until an actuator of the transmission reaches a defined operating state after opening of the flow cross-section, the actuator of the transmission subjected to and actuated by hydraulic fluid from opening of the flow cross-section, the conveying capacity of the hydraulic pump determined as a function of a deviation between the time period until the actuator reaches the defined operating state and a reference time period.

9. The method of claim 8, further comprising determining that the conveying capacity of the hydraulic pump is increased relative to a reference conveying capacity when the deviation between the time period until the actuator reaches the defined operating state and the reference time period is negative.

10. The method of claim 8, further comprising determining that the conveying capacity of the hydraulic pump is reduced relative to a reference conveying capacity when the deviation between the time period until the actuator reaches the defined operating state and the reference time period is positive.

11. The method of claim 1, further comprising, in response to determining that the conveying capacity of the hydraulic pump is greater than a reference conveying capacity, reducing an idle speed of a drive unit by one decrement.

12. The method of claim 1, further comprising, in response to determining that the conveying capacity of the hydraulic pump is less than a reference conveying capacity, raising an idle speed of a drive unit by one increment.

\* \* \* \* \*